Figure 1:
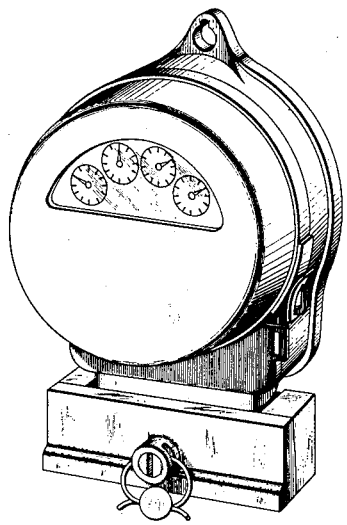

Jan. 2, 1934.  I. F. KINNARD  1,942,063
METER TESTING DEVICE
Filed June 10, 1931   2 Sheets-Sheet 1

Inventor:
Isaac F. Kinnard,
by *Chas. E. Muller*
His Attorney.

Jan. 2, 1934.  I. F. KINNARD  1,942,063
METER TESTING DEVICE
Filed June 10, 1931  2 Sheets-Sheet 2

Inventor:
Isaac F. Kinnard,
by Charles E. Mullen
His Attorney.

UNITED STATES PATENT OFFICE 1,942,063

METER TESTING DEVICE

Isaac F. Kinnard, Lynnfield, Mass., assignor to General Electric Company, a corporation of New York Application June 10, 1931. Serial No. 543,415

12 Claims. (Cl. 175—183)

My invention relates to devices for the testing of electric meters and in particular for the testing of house type induction watt hour meters.

The object is to provide testing facilities whereby meter testing is made safer, easier and quicker than heretofore and without the necessity of opening a service box, disturbing terminal connections or interrupting the customer's load. The device provides means for instantly cutting the meter to be tested out of circuit without disturbing its terminal connections.

The apparatus in general comprises what I chose to call a test adapter, a test plug and preferably also a service plug. The test adapter is made a part of the permanent meter installation and is a small box through which the permanent meter connections are carried and includes test clips or contacts and a contact slide whereby the meter may be disconnected without disturbing the terminal connections. The test adapter is provided with a cover which may be sealed in place. When this cover is removed the test clips and slide are exposed and are accessible for the purposes hereinafter described. The test plug is intended to be carried by the meter tester as part of his equipment and when the cover of the test adapter is removed the test plug may be inserted. The particular connections established by the insertion of the test plug may vary. To give one example the service meter is connected in series relation with a test meter and with adjustable loading apparatus which is also a part of the tester's portable equipment. The line connections to the customer's load are left undisturbed when the test plug is inserted except the customer's load current no longer passes through the service meter. After a meter has been tested the test plug is removed and this operation automatically reestablishes the normal connections. It is unnecessary to handle, remove or change any of the terminal connections since the insertion and removal of the test plug with respect to the adapted performs all the switching operations necessary. One of these switching operations performed by the insertion and removal of the test plug is to move a contact slide in the adapter which in its two positions cuts the service meter out of and into normal service. The service plug is used to operate this slide and to leave it in either of the positions desired so that it takes the place of a service switch to disconnect and connect a customer service as conditions warrant. Various additional objects and advantages of the apparatus will appear as the description proceeds.

Figure 2:
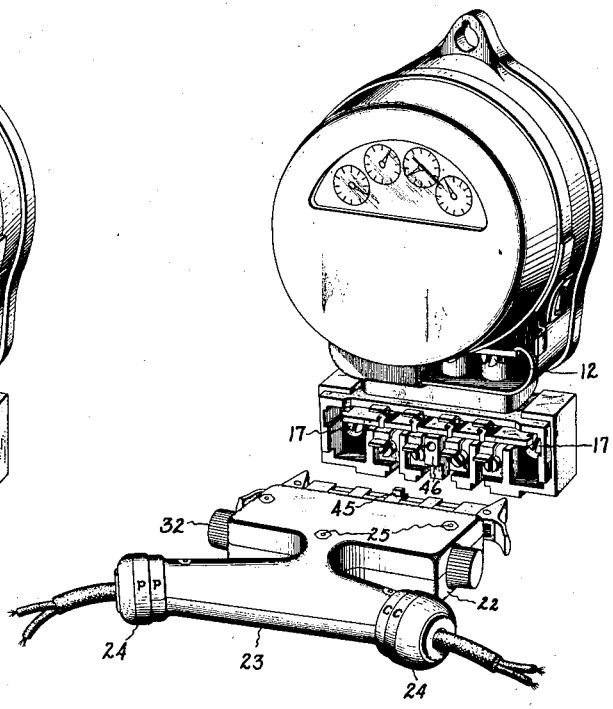
Figure 3:
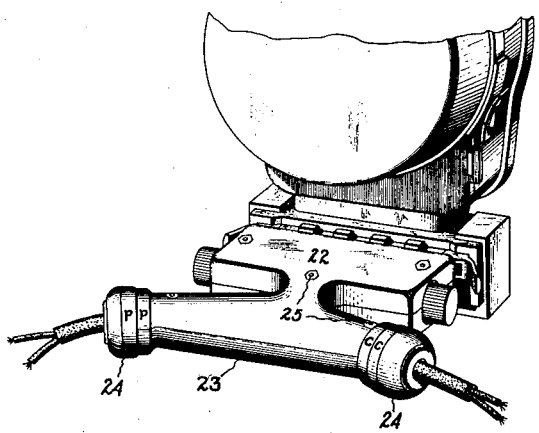
Figure 4:
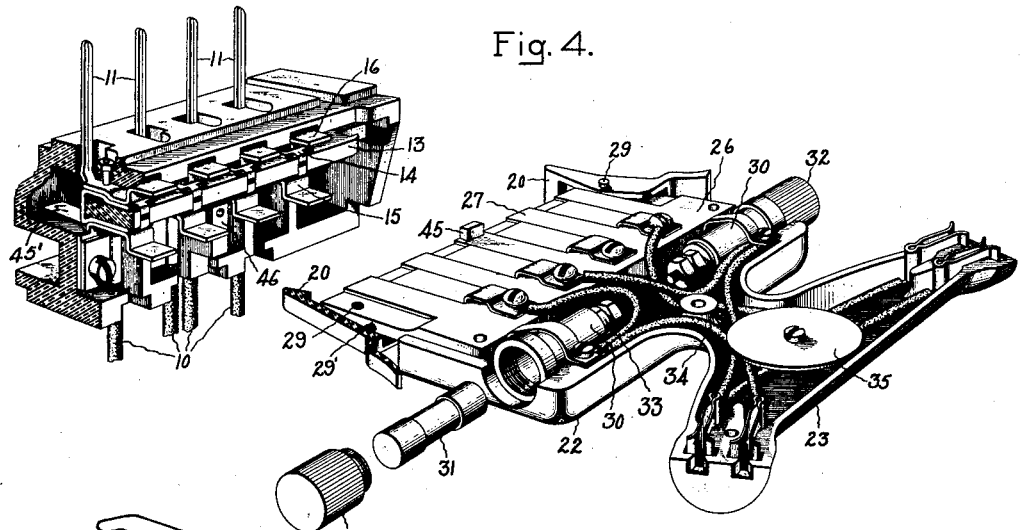
Figure 5:
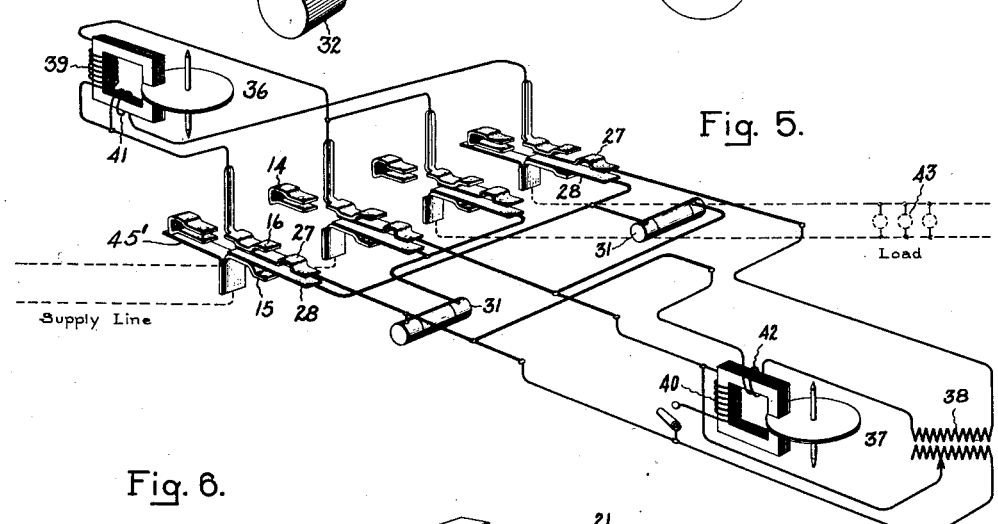
Figure 6:
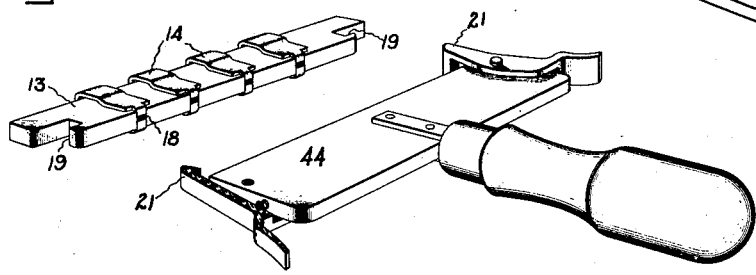

Fig. 1 shows a usual type of house meter with my test adapter secured in place below the terminal chamber of the meter and with its cover on and sealed in place; Fig. 2 shows the meter and test adapter with the cover of the latter removed and the test plug in position to be inserted in the adapter; Fig. 3 shows the parts of Fig. 2 but with the test plug as inserted into the adapter; Fig. 4 shows a part sectional view of the adapter and the test plug with its cover portion removed illustrating the general interior construction and arrangement; Fig. 5 illustrates circuit connections made when the test plug is placed in the adapter, and Fig. 6 illustrates the contact slide of the adapter and a service plug for operating the slide under certain conditions.

The features of the invention which are believed to be novel and patentable will be pointed out in the claims appended hereto. A detail description of a preferred form of the invention designed for the testing of the usual single phase house type induction watt hour meter follows.

The test adapter is intended to be a part of the permanent installation on the customer's premises. It is arranged so as to be installed either when the original electrical installation is made or may be added to most existing installations. It is small and fits the terminal chamber of the meter and may be used as illustrated in Fig. 1 or in an outdoor protective case enclosing the entire meter or between the meter and a meter service box when the latter is used. To provide this adapter to an existing installation the meter circuit connections indicated at 10 in Fig. 4 are removed from the meter terminal chamber, the prongs 11 of the adapter are inserted into the meter terminal chamber in the places from which the conductors 10 were removed and secured by the usual terminal holding means such as the screw 12 seen in Fig. 2 and then the conductors 10 are secured in the bottom terminals of the adapter as shown in Fig. 4. When the movable contact slide 13 is in place, as shown in Fig. 4, the clips 14 thereon connects the lower stationary clips 15, which are electrically connected to conductors 10, to the upper stationary clips 16 which are integral with the prongs 11 and connected to the service meter terminals. Thus the meter connections are the same as before except that the adapter has been inserted in these connections. The supporting structure and casing of the adapter is preferably made of molded insulating material, the conducting terminals and clips are of copper and the insulating portion of the contact slide or switch 13 of horn fiber. The upper surface of the adapter is preferably provided with raised surface portions shaped to fit the corresponding abutting surfaces of the meter terminal chamber to make a snug fit. The adapter is held in place by reason of the prongs 11 and screws, indicated at 17 in Fig. 2, may be used to secure the adapter to a supporting base, not shown.

The slide clip 13 is not removable from the adapter casing after the terminal clips are assembled therein due to the offset surfaces of the cooperating contacts but may be shoved to the rear from the position indicated in Fig. 4 into a hollowed-out portion of the adapter so as to disengage its conductor clips from the upper and lower test clips and disconnect the meter. This occurs whenever the test plug or service plug is inserted and shoved into position as in Fig. 3. The position of the clips on the contact slide in the disconnected position is shown in Fig. 5. These clips are held in place on the support 13 by being bent nearly around the support, the latter having notches 18 (Fig. 6) in its front edge in which the ends of the clips of reduced width engage. The clips are slightly resilient so as to make a firm contact when inserted between the test clips and spring apart slightly when removed from between the test clip; however, not sufficient to cause the tips to be withdrawn entirely from the notches 18. At the front ends of this sliding clip there are provided notches 19 for engagement with hooks 20 and 21 on the test and service plugs respectively in order that the clip may be drawn forward into circuit closing position when the plugs are withdrawn.

The test plug comprises a supporting casing comprising a body portion 22 and a handle portion 23 of molded insulating material which casing and handle is divided on a plane through both portions so that the top section may be removed to expose the hollowed-out interior. Figs. 2 and 3 show the casing assembled and Fig. 4 with the top section removed. The usual form of removable plug terminals 24 are provided for making connections from interior to the exterior circuit connections through the two ends of the hollowed-out handle portion, and these plugs and the corresponding plug receptacles are preferably marked P and C as indicated in Fig. 3 indicating potential and current circuits to avoid accidentally interchanging the plugs. The two sections of the casing are held together by five bolts 25. Two of these bolts pass through an interior clip holder 26 (see Fig. 4) which when the casing is open may be lifted out and its connections changed as desired.

This clip holder is made of insulating material and is provided with upper and lower clips 27 and 28 extending out of the casing on the side opposite the handle and spaced for engagement with and between the corresponding upper and lower test clips 16 and 15 of the test adapter when the plug is inserted. The upper and lower clips 27 and 28 are insulated from each other by the clip holder 26 and when inserted in the test adapter make engagement with the cooperating test clips as indicated in Fig. 5. The hooks 20 are hinged to this clipholder at 29 and springs 29' normally hold the hooks in position to engage the notches 19 of the contact slide of the adapter. Fuse holders 30 are secured to the rear edge of the clip holder. Fuses 31 are contained in these holders for protecting the testing equipment and meter. The fuses are renewable, as indicated in Fig. 4, by unscrewing the caps 32 which extend through the side walls of the casing and thus this may be done when the casing is assembled. The circuit through a fuse is from the metal holder 30, the interior metal portion of the cap to one end of the fuse, through the fuse to the metal terminal 33 which is suitably insulated from the holder 30. Flexible conductors 34 lead from the clips 27 and 28 to the fuses and to the plug receptacle terminals and are held in place by a fiber washer 35. It will be apparent that these flexible conductors permit the interior connections to be changed as desired to adapt for different meter connections and methods of test. In Fig. 5 it will be noted that the two outer lower clips 28 are connected together and to one of the fuses and that the two inner lower clips 28 are connected together and to the other fuse. These connections are not indicated in Fig. 4 because they are on the lower side of the clip holder but it will be understood that the lower clips 28 are provided with suitable provisions for such connections without further illustration.

Fig. 5 illustrates the connections for testing a single phase watt hour meter 36 by means of the test meter 37 and phantom load transformer 38. The full heavy line circuits represent those in the test plug, the dotted line circuits represent the permanent connections leading from the test adapter to the line and customer's load and the light full line connections are the test circuits outside the test plug. The contacts represented are those of the adapter and test plug when the test plug is inserted for a testing operation. It will be seen that the connection from the customer's load to the source of supply is completed through the lower clips on the test adapter and test plug. The energy for testing is obtained from this same source of supply and the fuses 31 are inserted in both sides of the line between the source and testing circuit connections which employ the upper sets of clips on adapter and test plug. The line voltage is brought to the upper two left hand sets of clips from the lower clips through the fuses and thus the entire testing circuit is protected against any damage from an overload or short circuit condition. The voltage coils 39 and 40 of the two meters are connected in parallel to the supply and the current coils 41 and 42 are connected in series with the secondary of the adjustable loading transformer 38, the primary of which is supplied through the voltage leads to the watt meter 37. It will be noted that when the test plug is removed the hooks 20 thereon simultaneously draw the sliding contact clip into place and close the normal circuit connections from the supply lines through meter 36 and to the customer's load indicated at 43 so that none of the circuit terminal connections need to be disturbed or handled and the customer's service is not interrupted. As will be noted in Fig. 5, the lower clips 28 of the test plug extend slightly farther toward the test adapter than the upper clips 27. The purpose of this arrangement is to disconnect the testing circuit first in withdrawing the test plug before the clips 14 of the slide complete the circuit between the upper and lower clips 15 and 16 of the adapter. This prevents any possibility of establishing a short circuit through clips 15, 14, 16 and 27. However, the lower clips 28 of the test plug, being slightly longer, maintain a circuit to the customer's load until the clips 14 of the slide establish a parallel connection thereto through the service meter so that the customer's service is not interrupted for even an instant when the test plug is withdrawn. The same arrangement prevents any possibility of short circuit and maintains continuous service as the plug is inserted.

As soon as the test plug has been withdrawn far enough to bring the sliding clip 13 of the adapter into full circuit closing position the hooks 20 are released by pressing their rear ends toward each other. The cover of the adapter is then sealed in place as shown in Fig. 1. The width of the opening in the adapter and the dimensions of the hooks on the test plug are such that the latter can not be unhooked from the notches 19 in the contact slide 13 until they have been withdrawn from the test adapter a sufficient distance to bring the contact slide into complete circuit closing position and thus it is not possible for a tester to completely withdraw the test plug until the customer's service and service meter are properly reconnected.

To prevent the test plug from being turned over and incorrectly and accidentally inserted into the test adapter bottomside up, means are provided for blocking the entrance of the test plug into the adapter except in its correct position. To this end I provide a projection 45 near the middle of the clip support of the test plug. This is shown in Figs. 2 and 4, and on the test adapter the insulating portion of the casing is brought out close to the contact slide as represented at 46. When the test plug is correctly inserted the projection 45 on the test plug is on the upper side of the contact slide and the projection 46 is on the lower side of this slide and consequently they do not engage. However, if the test plug is turned over and an attempt is made to insert it, projection 45 comes in contact with 46 and blocks the test plug from being inserted. Any equivalent means for preventing an incorrect insertion of the plug may be provided. However, it will be noted that the projecting portion 46 on the adapter is already provided for another purpose. It contains a threaded opening into which the seal pin of the cover is screwed when the latter is placed thereon as shown in Fig. 1.

If it is desired to disconnect the service, the service plug of Fig. 6 is used. This device is merely a handle secured to a crossbar of insulating material 44 suitably shaped and dimensioned to be inserted in the test adapter and shove the contact slide 13 to the disconnected position and provided with hooks 21 for engagement with the notches 19. These hooked ends are slightly shorter than those of the test plug so that the service plug may be unhooked from the contact slide 13 when the latter is in the disconnected position at the rear of the adapter. Thus the service plug is used for disconnecting and connecting a customer's service. When the contact slide 13 is moved to disconnected position to the rear of the test adapter it is firmly held in this position by the upward pressure of spring clips, one of which is indicated at 45' in Fig. 4, so that it may be safely left in this position and the adapter sealed without danger of accidental or unauthorized displacement.

The testing facilities thus described are for what is known as a two-wire, single phase watt hour meter and for a phantom load testing arrangement. For meters having a different number of wires and connection arrangement a test adapter with a different number and arrangement of clips and a test plug with a corresponding arrangement of cooperating clips or internal connections may be necessary. The particular arrangement of clips and internal connections of the test plug will vary for different types of meters and methods of testing, and such variations as need to be made in the invention to adapt it for different conditions are intended to be included within the scope of the appended claims.

It will be noted that the forward extending ends of the clips in the adapter are bent away from the contact surface thereof. This arrangement permits room for various other connections to be made to these clips even while the test plug is inserted and the arrangement thus facilitates special tests which it may be desirable to make and also permits the easy connection of testing equipment such as heretofore employed in case the tester has not as yet been provided with the improved test plug.

What I claim as new and desire to secure by Letters Patent of the United States, is:

1. A test adapter for insertion between a meter and its service connections to facilitate testing of the meter, said adapter comprising a casing with a removable cover with provisions for sealing the cover in place, and with internal connections for connecting and disconnecting the meter to and from the service lines therethrough, said connections including stationary spaced contact test clips, and a contact slide having thereon conducting means for bridging the stationary spaced contact clips, said slide being movable to connecting and disconnecting positions within the adapter, and means for preventing said slide from being removed from the adapter, the contact slide and clips being positioned so that they are accessible when the cover is removed.

2. A test plug for use in testing electric meters comprising a casing of insulating material comprising a body portion and a handle portion, said casing being divided into sections on a plane through both portions such that it may be opened, a contact clip holder removably supported in the body portion of said plug having test clips extending from the interior to the exterior of the casing on the side opposite to the handle portion, fuse holders and fuses therein supported in said casing, the fuse holders having removable cap closures extending through the walls of said casing whereby the fuses may be renewed when the casing is closed, connecting plug receptacles in the ends of the handle portion and changeable flexible circuit connections between the contact clips, fuses and receptacles.

3. Testing apparatus comprising a test adapter having terminals for connection to a meter and corresponding terminals for connection to line and load circuits, said terminals being separated by stationary connecting clips and by a movable contact slide with connecting clips thereon for cooperating with the first mentioned clips, said slide having two positions one for connecting and one for disconnecting the meter terminals with the line and load terminals through said clips, a test plug dimensioned to be inserted into the adapter and upon insertion to move the contact slide from connecting to disconnecting position and having means for moving the contact slide from disconnecting to connecting position when the test plug is withdraw from the adapter, said test plug being provided with conducting clips which engage with the stationary clips in the adapter when the test plug is inserted therein.

4. Testing apparatus comprising a test adapter for insertion between and containing terminals and connections for an electric meter and its line and load conductors, said connections including a switch having stationary spaced conducting clips and a movable contact slide with conducting portions for bridging said contact clips when the slide is in one position and for opening said connections in another position, said conducting clips and slide being housed in a chamber with a removable cover with facilities for sealing the cover in place and permitting access to the slide and conducting clips when the cover is removed, a test plug having a clip support dimensioned to be inserted into the adapter between the stationary clips thereof and move the contact slide from connecting to disconnecting position, test clips on opposite sides of said clip support positioned to engage with the spaced conducting clips of the adapter when such insertion is made, and connections in the test plug between certain of the clips thereof for establishing connections between corresponding line and load terminals of the test adapter when such insertion is made.

5. In combination, a test adapter for insertion between a meter and its service connections to facilitate testing of such meter, said adapter comprising a casing with a removable cover with provisions for sealing the cover in place, and with internal connections for connecting and disconnecting a meter to and from its service lines therethrough, said connections including stationary spaced contact clips and a contact slide having thereon conducting means for bridging the stationary spaced contact clips, said slide being movable and having connecting and disconnecting positions within the adapter, said contact slide and clips being positioned so as to be accessible when the cover is removed, means for preventing the slide from being removed from the casing, and a service plug provided with an insulating handle and a cross bar dimensioned to be pushed between the stationary clips of the adapter to shove the contact clip from its connecting to its disconnecting position when the cover of the adapter is removed and provided with movable hooks for engagement with the contact slide for moving the latter from disconnecting to connecting position when the plug is withdrawn, said hooks being disengageable from the contact slide in either of its positions.

6. In combination, a test adapter for insertion between a meter and its service connections to facilitate testing of such meter, said adapter comprising a casing with a removable cover with facilities for sealing the cover in place, and with internal connections for connecting and disconnecting a meter to and from its service lines therethrough, said connections including stationary spaced contact clips and a contact side having thereon conducting portions for bridging the spaced stationary clips, the slide being movable within the adapter to and from a connecting position between the stationary clips, a test plug having a clip support dimensioned to be inserted between the stationary clips of the adapter when the cover thereof is removed to shove the contact slide from its connecting position between said clips, test clips on the clip support of the plug for engagement with the stationary clips of the adapter when such insertion is made, movable hooks on the test plug dimensioned to engage with the contact slide and draw it to its connecting position when the test plug is removed, said hooks being disengageable from the contact slide only after the test plug has been sufficiently withdrawn from the test adapter to bring the contact slide into its connecting position.

7. In combination, a test adapter for insertion between a wattmeter and its load and supply lines to facilitate testing of such meter, said adapter comprising a casing of insulating material with a removable cover with facilities for sealing the cover in place and with internal connections comprising two sets of stationary contact clips spaced from each other and a movable contact slide having thereon conducting portions for bridging the stationary clips when the slide is inserted therebetween, one set of clips having connections to meter terminals and the other set of clips having connections to line and load terminals of the adapter, a test plug having a clip support dimensioned for insertion between the spaced clips of the adapter to move the contact slide from between the spaced stationary clips of the adapter to a disengaging position, two sets of test clips on and insulated from each other by the clip support of the test plug and positioned to engage with the two sets of stationary spaced clips of the adapter when the plug is inserted therein, one set of said test clips being longer than the other set whereby they engage and disengage with the corresponding set of adapter clips before and after the respective engagement and disengagement of the other two sets of clips on test plug and adapter when the plug is inserted and withdrawn, and means on the test plug for returning the contact slide of the adapter to engaging position after one set of adapter and test clips have disengaged but before the other set of adapter and test clips have disengaged when the test plug is removed.

8. Meter testing apparatus comprising in combination a test adapter consisting of a casing of insulating material and a removable cover with facilities for sealing the cover in place and having two sets of internal spaced stationary contact clips, one set connected to meter terminals and the other set connected to supply and load terminals of the adapter, and a contact slide supporting conducting portions for bridging the two sets of spaced contact clips, said slide being movable from connecting position between said clips to a disconnecting position and vice versa within said adapter, a test plug having a clip support dimensioned to be inserted between the stationary clips of the adapter when the cover thereof is removed, said support having sets of test clips on opposite sides positioned to engage with the sets of stationary clips of the adapter when the test plug is inserted therein, one set of test clips being longer than the other set whereby they engage before and disengage after said other set of test clips with the clips in the adapter when the test plug is inserted and removed, and means on the test plug for moving the contact slide from engaging to disengaging position between the periods of engagement of the long and short test clips as the test plug is inserted and moving the contact slide from disengaging position to engaging position between the periods of disengagement of the short and long clips when the test plug is removed.

9. Testing apparatus comprising in combination with a service watt hour meter, a test adapter having a casing of insulating material fitting the terminal chamber of the meter and having a removable cover with facilities for sealing such cover in place, said adapter containing two sets of stationary spaced contacts, one set connected to the meter terminals, supply lines and load lines connected to the other set of said contacts, a contact slide having conducting portions thereon for bridging the two sets of stationary contacts to connect the meter between the supply and load lines for normal measurement of the load supplied therethrough, said slide being non-removable from the adapter but movable therein from the aforesaid connecting position to a disconnecting position, a test plug having a clip support dimensioned to be inserted between the stationary sets of contacts in the adapter when its cover is removed, two sets of test clips on the test plug clip support positioned to engage with the two sets of stationary contacts of the adapter when such insertion is made, connections in the test plug between certain clips of the set which make engagement with the supply and load lines clips of the adapter to provide a connection between the supply and load lines through the test plug, a testing circuit including a test watthour meter connected with the set of clips of the test plug which engage with the contacts of the adapter connected to the service meter to connect the service and test meters in testing relation, and connections including fuses in the test plug between the supply connections and the test circuit to supply the latter with energy for testing from said supply lines, the contact slide of the adapter being movable from and to its engaging position respectively when the test plug is inserted and withdrawn from the adapter, whereby connections for testing the service meter without interrupting the load supply are made by inserting the test plug and the normal connections between the supply and load lines through the service meter and reestablished when the test plug is withdrawn.

10. Test facilities comprising in combination with a service watthour meter having potential and current terminals and supply and load lines therefor, a test adapter connected between the meter terminals and the supply and load lines, the connections in the adapter including spaced stationary contacts with a contact slide for normally bridging said contacts but movable to a disconnecting position so as to disconnect the meter from said lines, a test plug dimensioned to be inserted between said stationary contacts and move the contact slide to its disconnecting position, means on said plug to return the slide to connecting position when the plug is withdrawn, contacts on the test plug positioned to engage with the spaced contacts in the adapter when inserted, potential and current test circuits connected into said test plug, and connections in the test plug between the contacts thereon and the circuits connected therein for automatically establishing a supply circuit between the load and supply lines of the adapter, for connecting the potential terminals of the meter in parallel with said potential test circuit, for connecting the current terminals of the meter in series with the current test circuit and for establishing a supply connection between the supply lines and said potential and current circuits when the test plug is inserted in the adapter.

11. Meter testing and service connecting and disconnecting facilities comprising an adapter, a test plug and a service plug, the adapter comprising a casing with a removable cover with facilities for sealing the cover in place, and containing two sets of spaced stationary contacts, one set connected to meter terminals and the other set connected to service terminals in said adapter, and a contact slide with conducting portions thereon positioned to bridge the spaced sets of contacts, said slide being movable in the adapter from engaging to disengaging positions and thus serving as a switch between the meter and service terminals of the adapter, the test and service plugs being provided with an insulating supporting structure dimensioned to be inserted between the stationary contacts of the adapter when the cover of the latter is removed to shove the contact slide from its connecting to disconnecting position, and with hooks for engagement with the contact slide for drawing it into engaging position when such plugs are removed, the hooks on the two plugs being so arranged that only those on the service plug can be disengaged from the slide when the latter is in its disconnected position, and test contacts on said test plug for establishing meter testing connections with the contacts in the adapter when the test plug is inserted.

12. A meter test switch comprising a supporting block of insulating material, two line and two load terminals connected to spring clips on one side of said block, four meter terminals connected to spring clips on the opposite side of said block, the clips on one side of said block being spaced from and facing the clips on the opposite side of said block in parallel planes, and means guided to slide in a plane between said spaced clips having contacts for simultaneously establishing connections between the clips which face each other to connect the meter terminals to the line and load terminals when the slidable means is in one position, and having other contacts for simultaneously establishing connections between the line and load terminals through the corresponding clips when the slidable means is in another position, the slidable means having an intermediate position where both of the above noted connections are established.

ISAAC F. KINNARD.